United States Patent [19]

Appenzeller

[11] 4,188,698
[45] Feb. 19, 1980

[54] SEALING ARRANGEMENT AT A ROLL

[75] Inventor: Valentin Appenzeller, Kempen, Fed. Rep. of Germany

[73] Assignee: Eduard Küsters, Krefeld, Fed. Rep. of Germany

[21] Appl. No.: 866,066

[22] Filed: Dec. 30, 1977

[30] Foreign Application Priority Data

Apr. 26, 1977 [DE] Fed. Rep. of Germany ....... 2718414
Jul. 12, 1977 [DE] Fed. Rep. of Germany ....... 2731365

[51] Int. Cl.² .............................................. B21B 13/00
[52] U.S. Cl. .................................. 29/116 AD; 68/258; 100/93 RP
[58] Field of Search ................... 29/116 AD, 110, 113; 68/258; 100/93 RP, 155 R

[56] References Cited

U.S. PATENT DOCUMENTS

| | | | |
|---|---|---|---|
| 3,146,160 | 8/1964 | Kankaanpaa | 68/258 |
| 3,196,520 | 7/1965 | Appenzeller | 68/258 |
| 3,932,074 | 1/1976 | Morris | 277/81 P |

*Primary Examiner*—Robert I. Smith
*Attorney, Agent, or Firm*—Kenyon & Kenyon

[57] ABSTRACT

A sealing arrangement for a roll consisting of a stationary core and a hollow cylinder surrounding the core with a spacing and rotatable thereabout, which includes a longitudinal seal made up of a seal carrier disposed in a slot in the core, the seal carrier itself forming a slot in which there is disposed a sealing strip made of a material having good gliding properties extending therefrom radially toward the inner wall of the hollow cylinder and pressed there against by the pressure of a pressure liquid.

14 Claims, 5 Drawing Figures

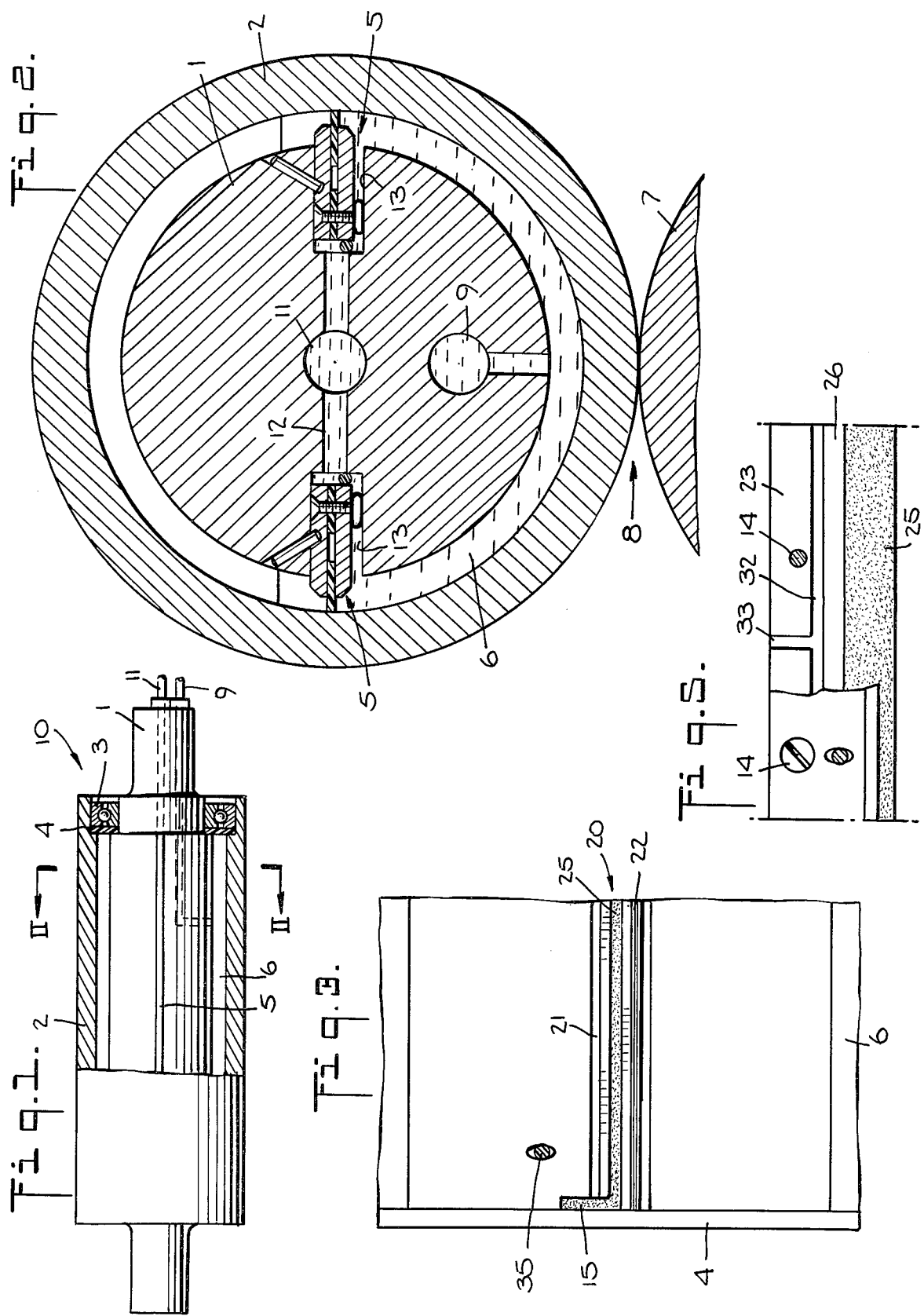

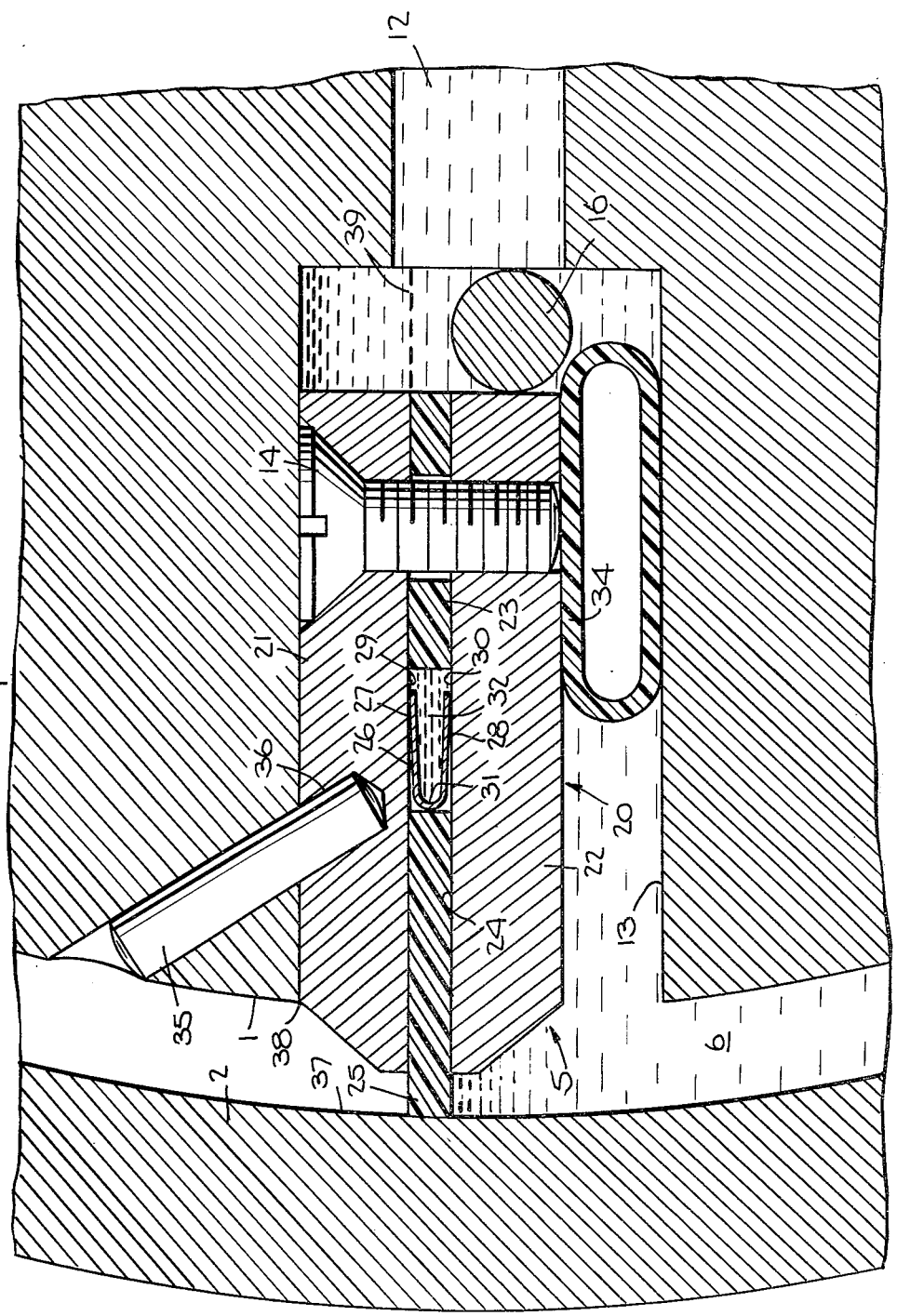

SEALING ARRANGEMENT AT A ROLL

BACKGROUND OF THE INVENTION

This invention relates to what are known as "swimming rolls" [a trademark of Eduard Kuesters] in general and more particularly to an improved sealing arrangement for such rolls, which minimizes friction.

The rolls which are known as "swimming rolls" consist of a stationary core and a hollow roll or cylinder surrounding the stationary core with a spacing therefrom and rotatable thereabout. Seals are provided at the ends of the roll between the core and the hollow cylinder. Longitudinal seals are also provided along the core on both sides thereof. These seal the space between the core and the inside of the hollow cylinder so as to form a longitudinal chamber situated on the working side of the roll and which is filled with pressure liquid. On each side of the core one of the respective longitudinal seals is disposed in a longitudinal slot formed in the core, and can be pushed out of the slot against the inside of the hollow roll by the pressure of a pressure liquid in the chamber formed by the longitudinal seals.

In "swimming rolls" of this type, the longitudinal seals must rest against the inner circumference of the revolving hollow cylinder with a certain amount of pressure in order to insure the necessary sealing against the liquid pressure in the longitudinal chamber, which pressure may be several atmospheres. In the design described in U.S. Pat. No. 2,908,964 a longitudinal notch on the core is, engaged by a strip-like seal closing the side of the longitudinal chamber. The strip-like seal is inclined and has its outer edge resting against the inside circumference of the hollow roll, the seal extending radially between the core and hollow roll. Contact pressure is generated by the pressure of the liquid acting on the oblique side of the seal or by means of a spring provided for this purpose. The seal, which rests under a certain amount of pressure against the inner circumference of the rotating hollow roll, generates a certain amount of friction. This friction, while unimportant at lower rotative speeds, can no longer be neglected when considering the total power required when running at higher speeds. Such high speeds, using such a roll, are common, for example, in the manufacture or the further processing of paper webs, e.g., process which operate at 1000 m/min and more.

Another sealing arrangement for "swimming rolls," is described in German Pat. No. 2,025,777. The longitudinal seal in this case is a strip shaped bar piston which is fitted into the longitudinal slot. Pressure liquid is supplied through a line leading to the bottom of the longitudinal slot. A portion of the pressure liquid passes through fine transversal canals in the ledge-like bar piston and leaves in the vicinity of the sealing surface thereof which rests against the inside of the hollow cylinder.

Although it is the intent that a continuous film should develop in this manner between the bar piston and the passing inner wall of the hollow roll, such is only achieved in an imperfect manner in practice. This is true particularly on that side of the contact area of the bar piston which is opposite the running direction of the hollow roll. Thus, even with the design of German Pat. No. 2,025,777 friction must be expected. And, once again, a certain portion of the total power required for the drive is wasted in overcoming this friction.

SUMMARY OF THE INVENTION

It is the object of the present invention to provide a sealing arrangement for "swimming rolls" of the general type described above in which the friction associated with the contact of the longitudinal seals with the inner wall of the hollow roll for sealing the longitudinal chamber, is minimized. According to the present invention, this problem is solved as to each longitudinal seal by having a seal carrier, the length of which corresponds to the longitudinal seal, inserted into the core's longitudinal slot. The seal carrier is radially secured in the slot. It is sealed on both sides against the flanks of the longitudinal slot and has a slot from which a sealing strip of a material which promotes easy gliding, extends radially movably toward the inner wall of the hollow roll. The sealing strip is arranged so that it can be pushed from the seal carrier against the inner wall from the slot by means of the pressure of a pressure liquid.

Through the use of a sealing strip made of a material with good gliding properties, friction can be noticeably reduced over that in the previous designs. Materials which are particularly suitable for use as the sealing strip are plastic materials which exhibit, with the steel of the hollow cylinder, a low friction pair of gliding materials. However, other materials such as graphite are also useful in constructing the sealing strip of the present invention.

The sealing strip can be made thin since it needs no stability of its own. The seal carrier, in the slot of which the sealing strip is seated, supports the sealing strips along its entire length in both circumferential directions. The seal carrier extends from the case up to a few millimeters from the inside wall of the hollow roll so that the seal strip just "peeks out" and is thus unsupported only over a short span. It is a further important consideration, that the sealing strip can move progressively out from the slot under the pressure of the pressure liquid as its surface resting against the inside of the roll wears. This accomplishes an automatic wear compensation. Since a wear distance which almost corresponding to the width of the sealing strip is available, such a sealing arrangement has a service life comparable to that of the known sealing arrangements, even though friction is reduced considerably. It is also possible to provide canals in the seal carrier, through which the pressure liquid can be fed to the slot.

What happens in the device described in German Pat. No. 2,025,777 regarding the longitudinal seal used there, also occurs where the sealing strip of the present invention disposed in the separate seal carrier is used. The sealing strip of the present invention is pushed by a pressure liquid which can be separately controllable from the pressure liquid in the longitudinal chamber. This pressure liquid pushes the sealing strip radially outward from the axis of the roll against the inner wall of the hollow cylinder. However, the displacement takes place between the sealing strip and the seal carrier. The seal carrier, however, is fixed immovably in the radial direction in the longitudinal slot of the core of the roll. In order that the sealing strip need not be fitted too tightly into the slot of the seal carrier for it to be tightly seated therein, it is of advantage to have a separate sealing profile resting against the underside, or inside edge, of the sealing strip in the slot in order to seal the two flanks of the slot to the seal carrier. This sealing profile can be formed by a U-section, particularly one consisting of steel, in which the legs forming the two sealing lips make contact at the flanks of the slot and which has a cross piece at the underside of the sealing strip.

It is also advisable to make the sealing strip of an elastic material. A design of fiber-glass reinforced polytetrafluoroethylene has proven itself particularly useful. Polytetrafluoroethylene has excellent gliding properties against steel, but has at the same time a tendency to creep under conditional mechanical strees. The creeping tendency is counteracted by the fiber-glass reinforcement without any adverse effect on the gliding properties.

In order to ensure a proper seal also at the ends if the thermal contraction of the sealing strip and the seal carrier is different, an embodiment is disclosed in which the sealing strip is bent out of the slot around the end of the seal carrier. In this manner, no gap can occur at the ends if the sealing strip contracts.

The combination of a U-shaped sealing profile consisting of steel with the elastic sealing strip of the design mentioned above has special advantages. The seal remains tight even in the event of thermal expansion. Since the sealing strip need not be self supporting and can be made correspondingly thin, it gives way and the U-shaped profile expands to the same extent as the environment, which likewise consists of steel. In designs, for example, according to the aforementioned U.S. Patent, where the sealing strip is self-supporting and consists of bronze or similar material, problems can arise in the case of large temperature differences. Either more play must be left at the ends of the sealing ledge, which causes a leak in the pressure chamber, or a longitudinal compression stress occurs at the sealing ledge if the clearance is too small, leading to an undesirable buckling of the same.

One simple embodiment of the seal carrier comprises two flat strips opposing each other with their flat sides parallel and at a spacing from each other. A spacer strip is placed between the two flat strips leaving a slot free on one side. An important advantage of this embodiment is that no chip removing machining is necessary to form the slot. Rolled steel or rolled bronze with exact external cross sections is available for forming the flat strips and spacer strip, for example. Assembly can be accomplished by rivets, screws or the like. Further, the canals which form the access for the pressure liquid to the bottom of the slot can be easily made in this manner and without chip removing machinery. This can be done by simply interrupting the spacer strip at certain points to form the canals.

In an additional embodiment, a spacer element which holds the seal carrier at a distance from the bottom of the longitudinal slot in the case such that pressure liquid supplied from the bottom of the longitudinal slot can pass into the canals, is provided. The spacer element can be accomplished by having one of the flat strips or the spacer strip protrude beyond the back of the seal carrier. Alternatively a separate wire which is inserted into the bottom of the slot can be used.

In the preferred embodiment, the seal carrier is spaced in the circumferential direction from one of the flanks of the longitudinal slot in the core. For sealing of the seal carrier in the longitudinal slot, an elastic sealing element which extends over the length of the seal carrier and pushes the seal carrier under compression against the other flank of the longitudinal slot, is provided on one side between the one side of the seal carrier and the one flank.

This embodiment has advantages with respect to the machining costs. Since the seal carrier need no longer be fitted accurately into the longitudinal slot, it is no longer necessary to machine the longitudinal slot precisely at its flanks. Such machining represents considerable costs, since the core may well be a heavy work piece which is 10 m long and has a diameter of 50 cm or more. With the present invention, the longitudinal slot can now be milled into the core without any special requirements as to precision, since the sealing between the flanks of the longitudinal slot and the longitudinal seal no longer takes place directly but through the sealing element which is disposed on one side in the clearance between the seal carrier and the longitudinal slot. Thus, the sealing element simultaneously assumes the functions of sealing and securing the seal carrier in the circumferential direction. A particularly useful embodiment of the sealing element comprises a tube compressed in the transverse direction, and extending along the length of the sealing carrier. The seal carrier can be secured in the longitudinal slot in the radial direction in different ways. One particularly simple way is through the use of pins disposed in the core and engaging with the seal carrier.

BRIEF DESCRIPTION OF THE DRAWINGS

FIG. 1 is an overall view of the roll according to the present invention, partly broken away along the longitudinal center plane.

FIG. 2 is a cross section taken along the line II—II of FIG. 1.

FIG. 3 is a more detailed view of the left end of the core of FIG. 1 with the hollow roll omitted.

FIG. 4 is a section of FIG. 2 on a large scale.

FIG. 5 is a partial view from the top illustrating the seal carrier.

DETAILED DESCRIPTION OF THE INVENTION

The roll 10 of the present invention includes a stationary core 1 which is supported in a rolling mill frame and a hollow cylinder 2 surrounding the core 1 and rotatably supported with respect thereto by means of bearings 3 mounted at the ends. The stationary core 1 is a solid cylinder which extends through the hollow cylinder 2 lengthwise, but leaving an annular space between itself and the inner wall of the hollow cylinder 2, so that the roll can bend somewhat without touching the revolving hollow cylinder 2. At the ends of the working width of the roll 10, ring seals 4 are provided between the hollow cylinder 2 and stationary core 1. These are located within bearings 3 and seal the space between the core 1 and hollow cylinder 2 in the axial direction. In addition, on both sides of the core 1 there are arranged longitudinal seals 5 which extend from end seal 4 to end seal 4 and divide the space between the core 1 and hollow cylinder 2 into two chambers one of which is a longitudinal chamber 6 on the working side of the roll. The working side of the roll, as shown on FIG. 2, forms a roll gap 8, with a counter roll. The longitudinal chamber 6 can be filled with a pressure liquid by means of feed line 9. The pressure liquid transmits the force taken up by the hollow cylinder 2 to the stationary core 1 which can bend under this load within the hollow cylinder 2 without the shape of the hollow cylinder 2 being affected thereby. Through suitable choice of the pressure in the longitudinal chamber 6, deflections of the hollow cylinder 2 can also be adjusted in a predetermined manner.

The design of the longitudinal seal 5, of FIG. 1 which is indicated thereon simply by two parallel lines for sake of simplicity, is shown most clearly by FIG. 4. The longitudinal seal 5 includes a seal carrier 20 which, in the illustrated embodiment, includes an upper flat strip 21, a similar lower flat strip 22, disposed opposite and parallel to the strip 21 with a space therebetween forming slot 24, and a spacer strip 23 which holds the flat strips 21 and 22 at a distance. A sealing strip 25 is movably inserted in the gap between the two strips 21 and 22. The longitudinal seal is disposed in a slot 13 which extends along the side of the core 1. The flat strips 21 and 22 and the spacer strip 23 are held together by means of bolts 14 equally spaced along the length of the longitudinal seal 5. At the back of the sealing strip 25 there is disposed a part 26 of U-shaped profile having legs 27 and 28 which rest against flanks 29 and 30 of the slot 24, acting as sealing lips, and which has a cross piece 31 resting against the back side of the sealing strip 25. The slot 24, along with the spacer strip 23 and the sealing profile 26, form a substantially closed chamber 32, to which pressure liquid is supplied through transverse canals 33 provided in the spacer strip 23. [Shown in more detail in FIG. 5]. The pressure liquid for this purpose is separately fed from the pressure liquid in the longitudinal chamber 6, using a line 11 shown on FIGS. 1 and 2. Transverse canals 12 lead from the line 11 into the bottom of the longitudinal slot 13 which extends along the core 1. In order to insure trouble free transfer of the pressure liquid from the transverse canals into the chamber 32, the seal carrier 20 is spaced from the bottom of the slot 13. This can be done by letting one of the flat strips 21 or 22 or the spacer strip 23 protrude somewhat to the right in FIG. 4 such as is indicated for that flat strip by the dashed line 39. Alternatively, as shown, a spacer wire 16 can be inserted in the longitudinal slot 13 before placing the seal carrier 20 therein in order to hold the seal carrier 20 at the required distance.

As illustrated by FIG. 4, the seal carrier 20 rests against one flank of the slot 13 but is spaced from the other flank. In order to hold it in place on the flank, and to seal the space between the seal carrier and the other flank, the seal carrier is held elastically against the upper flank by a flattened tube 34. As noted, this at the same time provides sealing in the radial direction against the pressure of the pressure liquid present in the longitudinal slot 13 below the seal carrier 20.

In order that the seal carrier as a whole will be relieved of this pressure and not be driven radially out of the slot 13, it is held to the core 1 by pins 35 which, in the illustrated embodiment are inserted at an angle, from the outside, engaging corresponding holes 36 in this flat strip 21.

The pressure liquid which is brought in through the transverse canal 12 thus acts only in the chamber 32. It pushes the sealing strip 25 radially against the inner wall 37 of the hollow cylinder 2 thereby sealing the chamber 6.

The seal carrier is not fastened at the upper flank of the slot 13, but is pressed against it only by the pressure of the pressure liquid in the chamber 6 and the sealing element 34. In order to counteract tilting moments on the seal carrier 20 about the point 38, the sealing element 34 is arranged on the right-hand side in FIG. 4. However, even so, the arrangement is already designed so that the part of the seal carrier located in the slot 13 is wider than the part which protrudes from the core 1 toward the inside 37 of the hollow cylinder.

The sealing strip 25 can consist of an elastic sealing material, particularly a fiber-glass reinforced polytetrafluorethylene. At the ends, i.e., in the vicinity of the ring seals 4, the sealing strip 25 is provided with a bend 15, as is illustrated in FIG. 3.

FIG. 5 illustrates how the canals 33 which form the access to the chamber 32 are formed by the interruption of the spacer strips 23. The spacer strips 23 along with the flat strips 21, and 22 can be made from suitable rolled material with a clean surface, such as rolled steel.

The seal carrier 20 extends to a point a few millimeters from the inner wall 37 of the hollow cylinder 2 so that the sealing strip 25 must bridge only a small free span. Otherwise, the sealing strip is held between the flat strips 21 and 22 almost over its entire width. Wear which occurs at the contact surface of the sealing strip 25 with the inner wall 37 of the hollow cylinder 2 is automatically compensated in that the sealing profile 26 moves to the left of FIG. 4 under the pressure of the liquid in chamber 32 pushing the sealing strip 25 gradually more and more out of the slot 24 between the flat strips 21 and 22. Thus, a wear reserve corresponding almost to the width of the sealing strip 25 is available.

What is claimed is:

1. A sealing arrangement for a roll assembly comprising a non-rotative core in which circumferentially interspaced longitudinal slots are formed, said core being surrounded by a rotative hollow cylindrical roll, said core and cylindrical roll being radially interspaced and forming an annular space therebetween, and longitudinal seals radially movably positioned in said slots and pressed against the inside of said cylindrical roll to form said annular space into two chambers one of which contains liquid under pressure; wherein the improvement comprises said seals each being in the form of a longitudinal seal carrier radially immovably positioned in one of said slots and extending radially therefrom so as to radially partially span said space, said carrier forming a radial seal slot of substantially less thickness than the carrier and facing the inside of said cylindrical roll, and a thin sealing strip extending the length of said seal slot and radially positioned therein, said sealing strip having a substantial portion within said seal slot and supported by the flanks of the seal slot and a portion of the sealing strip extending radially from the seal slot and spanning said space for its radial extent between said seal carrier and the inside of said cylindrical roll, said sealing strip being radially movable in said seal slot and said carrier having pressure means for pressing said sealing strip radially against the inside of the cylindrical roll.

2. The arrangement of claim 1 in which said cylindrical roll is made of metal, said sealing strip is a non-metallic sealing strip and said seal carrier is made of metal and via the flanks of the carrier's said seal slot supports said non-metallic sealing strip throughout its said portion within said seal slot.

3. The arrangement of claim 2 in which said sealing strip is made of fiberglass reinforced polytetrafluoroethylene.

4. The arrangement of claim 2 in which ring seals are positioned at the ends of said core and cylindrical roll and said sealing strip has ends which project beyond the ends of said seal slot and are bent over the ends of said seal carrier so as to seal against said sealing ring.

5. The arrangement of claim 1 in which said pressure means is formed by means for introducing pressurized fluid separate from said liquid, into said seal slot behind the inside edge side of said sealing strip.

6. The arrangement of claim 5 in which said sealing strip is freely slidable in said seal slot and a seal element for said pressurized fluid is positioned in the core's said slot behind said sealing strip and extends the longitudinal length thereof, said seal element in cross section having a U-shape profile having a closed end engaging said seal strip and backwardly extending legs engaging the flanks of said seal slot and being made of elastic material.

7. The arrangement of claim 6 in which said sealing strip is made of non-metallic material and said seal element is made of metal.

8. The arrangement of claim 5 in which said seal carrier comprises a flat spacer strip having opposite sides to which two slot-forming flat strips are fixed and project radially forwardly from the spacer strip so as to define said seal slot.

9. The arrangement of claim 8 in which said spacer strip comprises a longitudinally extending series of longitudinally interspaced flat strip lengths forming transverse canals between the lengths and which open transversely to the bottom of said seal slot behind said sealing strip, and there is a fluid passage means for connecting said pressurized fluid to said canals.

10. The arrangement of claim 9 in which said fluid passage means comprises means for conducting said pressurized fluid into the bottom of said slot formed in said core, and spacing means spaces said seal carrier from said bottom so as to form a longitudinal space connecting with said canals.

11. The arrangement of claim 10 in which one of said slot-forming strips projects backwardly beyond said spacer strip and engages said bottom to form said spacing means.

12. The arrangement of claim 10 in which a longitudinally extending strand is positioned in said bottom and is engaged by one of said slot-forming flat strips to form said spacing means.

13. The arrangement of claim 9 in which said slot formed in said core is wider in the core's circumferential direction than the thickness of said seal carrier and means are provided for elastically pressing the seal carrier against one of the flanks of the just-named slot and sealing the carrier therein so as to keep separated said liquid and said pressurized fluid.

14. The arrangement of claim 13 in which the abovesaid means is a radially elastically compressible tube positioned between said seal carrier and the other of the flanks of said slot formed in said core.

* * * * *

UNITED STATES PATENT AND TRADEMARK OFFICE
CERTIFICATE OF CORRECTION

PATENT NO. : 4,188,698
DATED : February 19, 1980
INVENTOR(S) : Valentin Appenzeller It is certified that error appears in the above—identified patent and that said Letters Patent is hereby corrected as shown below:

Column 2, line 33, cancel "case" and replace with --core--.

Column 2, lines 41-42, cancel "corresponding and replace with --corresponds--.

Column 3, line 53, cancel "case" and replace with --core--.

Column 8, line 17, cancel "9" and replace with --5--.

Signed and Sealed this

Eighth Day of July 1980

[SEAL]

Attest:

SIDNEY A. DIAMOND

Attesting Officer

Commissioner of Patents and Trademarks